E. KUHNS.
GRAIN-DRILL.
No. 171,907. Patented Jan. 4, 1876.
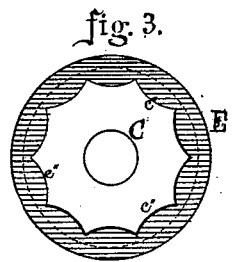
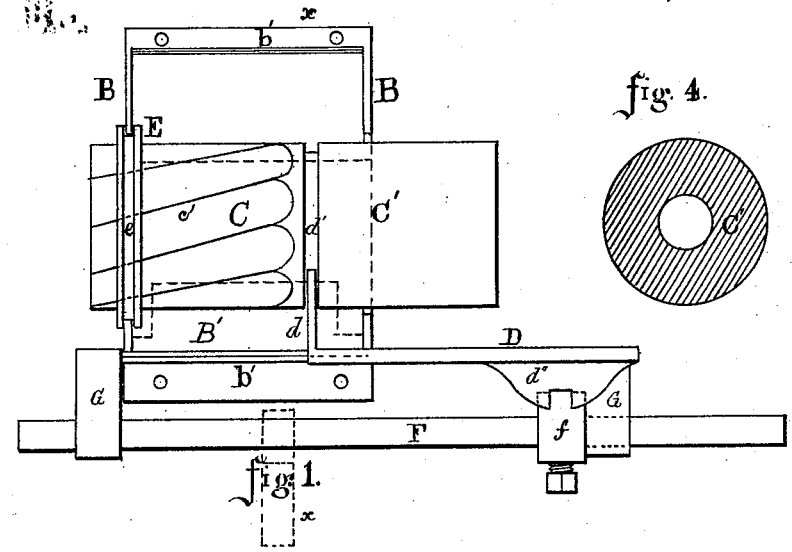
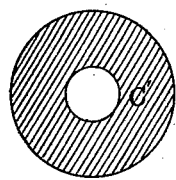
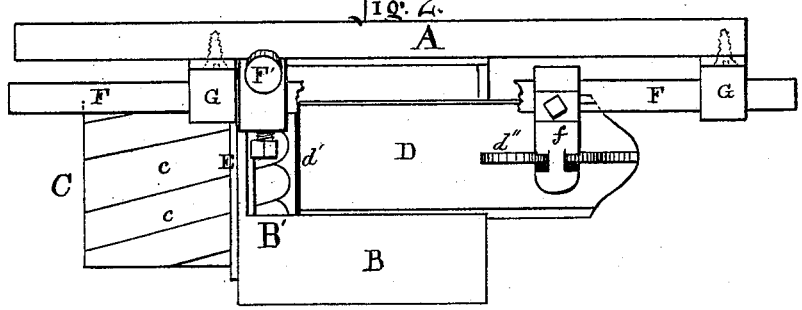
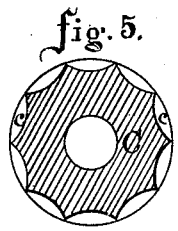
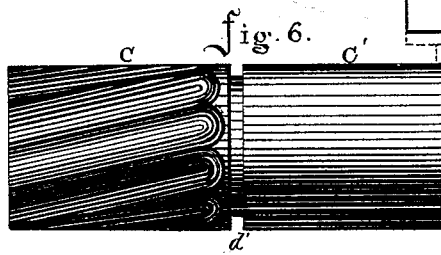
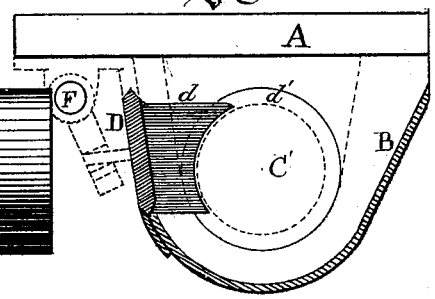
Attest
C. M. Carroll
E. A. Bulley
Inventor
Edward Kuhns
per Blanchard & Singleton
Attys.

UNITED STATES PATENT OFFICE.

EDWARD KUHNS, OF LOGANSPORT, INDIANA, ASSIGNOR OF ONE-HALF HIS RIGHT TO BENJAMIN KUHNS, OF DAYTON, OHIO.

IMPROVEMENT IN GRAIN-DRILLS.

Specification forming part of Letters Patent No. 171,907, dated January 4, 1876; application filed July 29, 1875.

*To all whom it may concern:*

Be it known that I, EDWARD KUHNS, of Logansport, in the county of Cass and State of Indiana, have invented certain new and useful Improvements in Grain-Drills; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 is a plan view looking down, with the board A of Fig. 2 removed. Fig. 2 is a side view. Figs. 3 and 4 are different end views of the cylinder; Figs. 5 and 6, one end and side view of the cylinder; Fig. 7, end view and section on line $xx$ of Fig. 1.

This invention relates to that class of seed-drills in which the feed-cylinder is partially grooved, and a separating-plate is used in connection therewith, with other operating devices, whereby the quantity of seed to be dropped may be regulated at pleasure, as will be more fully hereinafter described, and set forth in the claims.

A is the board or frame upon which is the main hopper, and is not shown in Fig. 1. B B is the cup, which is fastened to board A by-screws in flanges $b'$ $b'$. The drawing represents one cup of a series, which is to be connected by a rod, F, passing through boxes G G, which are fastened to the cups B B, &c. C C' are the two sections of one cylinder, the part C being spirally grooved, and C' being smooth. Between these is a neck or groove, $d'$, into which is fitted a flanged partition-piece, $d$, which projects from the inner end of the slide-door D. This piece $d$ permits the cylinder to revolve on its axis, and it is retained in position by $d$ wherever it may be fixed by the stop-dog $f$. E is a grooved collar, which is interiorly scalloped to suit the grooves in the cylinder, and has a groove, $e$, which is fitted to the edges of the end of the cup, and thus retains the collar in its position, while it can revolve with the cylinder, and at the same time permit the cylinder to pass actually through it for adjustment. F is the rod to which all the cups are fastened, and by which the openings in the cup for the seed to flow out are regulated.

In Fig. 1 the dog $f$ is at the extreme right, and is adjusted to permit an opening of three-fourths of the length of the cup. In Fig. 2 the handle F' is at the extreme left, and stops the opening at about one-fourth. This handle and dog can be arranged to suit any distance, as they are fastened by set-screws. G G represent the boxes which support the rod F.

The operation of the device is as follows: The hopper above the cup, which is not shown, is supplied with seed, which flows into the cup. The revolution of the cylinder causes the seed in that part where the spiral grooves are to pass upward to the opening B', where they are lifted by the spiral grooves, the smooth part of the cylinder sliding over the seed, the partition $d$ separating the outlet from the interior, and the size of the opening may be changed, while the machine is in motion, from the narrowest to the widest space.

Having thus described my invention, what I claim, and desire to secure by Letters Patent, is—

1. A feed-wheel having one portion, C, grooved spirally, said grooves extending from about the middle of the wheel to one end thereof, and the other portion, C', being cylindrical, the two portions being separated by an annular groove, $d'$, as and for the purpose set forth.

2. The combination of the spirally-grooved and smooth cylinder with the neck $d'$ and the adjustable partition-plate $d$, substantially as and for the purpose described.

3. The combination of the collar E, cylinder C C', and sliding door D with the adjustable partition $d$, substantially as and for the purpose described.

In testimony that I claim the foregoing as my own invention, I affix my signature in presence of two witnesses.

EDWARD KUHNS.

Witnesses:
   A. H. DAME,
   ALLEN B. DAVIDSON.